US012732816B2

(12) United States Patent
Xu et al.

(10) Patent No.: US 12,732,816 B2
(45) Date of Patent: Sep. 8, 2026

(54) SYSTEMS AND METHODS FOR VIRTUAL PRIVATE NETWORK USING WIRELESS NETWORK SLICE

(71) Applicant: Verizon Patent and Licensing Inc., Basking Ridge, NJ (US)

(72) Inventors: Kevin Xu, Warren, NJ (US); Valerie Feldmann, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 122 days.

(21) Appl. No.: 18/739,620

(22) Filed: Jun. 11, 2024

(65) Prior Publication Data

US 2025/0380141 A1 Dec. 11, 2025

(51) Int. Cl.
*H04W 12/088* (2021.01)
*H04W 28/02* (2009.01)
*H04W 28/24* (2009.01)

(52) U.S. Cl.
CPC ..... *H04W 12/088* (2021.01); *H04W 28/0205* (2013.01); *H04W 28/24* (2013.01)

(58) Field of Classification Search
CPC ............................ H04W 12/088; H04W 28/24
See application file for complete search history.

(56) References Cited

U.S. PATENT DOCUMENTS 10,178,646 B2 * 1/2019 Bosch ..................... H04W 8/08
11,558,779 B2 * 1/2023 Barton ................ H04L 41/0896
11,659,397 B2 * 5/2023 Andrews ............... H04W 12/37 455/410
11,743,772 B2 * 8/2023 Bogineni .......... H04W 28/0967 370/235
11,871,318 B2 * 1/2024 Balakrishnan .... H04W 28/0992
12,133,146 B2 * 10/2024 Gage ................... H04L 41/0895
12,284,525 B2 * 4/2025 Wang ...................... H04L 67/51
12,342,269 B2 * 6/2025 Cakulev ................ H04W 24/10
2022/0141095 A1 * 5/2022 Beeram ............... H04L 41/0894 370/254
2022/0286891 A1 9/2022 Zhu et al.
2023/0232229 A1 7/2023 Raghavachari et al.
2023/0379764 A1 * 11/2023 Zhu ....................... H04W 28/24
2024/0048479 A1 * 2/2024 Zhang ..................... H04L 45/85
2024/0073848 A1 * 2/2024 Ryu ...................... H04W 36/08
2024/0104817 A1 * 3/2024 Paczkowski ...... H04W 28/0268
2025/0081032 A1 * 3/2025 Cai .................. H04W 28/0289
2025/0126522 A1 * 4/2025 Balmakhtar .......... H04W 28/10
2025/0212105 A1 * 6/2025 Seed ................... H04L 41/0895
2025/0344132 A1 * 11/2025 Cakulev ................ H04W 48/18

* cited by examiner

*Primary Examiner* — Viral S Lakhia

(57) ABSTRACT

A first device described herein may maintain a set of slice forwarding rules that include information associating a particular set of traffic attributes with a particular network slice of a wireless network. The first device may receive, via a particular interface of one or more interfaces of the first device, traffic from a second device. The first device may compare attributes of the traffic to the slice forwarding rules. The first device may determine, based on the comparing, that the attributes of the traffic match the particular set of attributes associated with the particular network slice of the wireless network; and may output, via the particular network slice, the traffic to the wireless network. The first device may include a Fixed Wireless Access ("FWA") device that communicates with a radio access network ("RAN") of the wireless network.

20 Claims, 11 Drawing Sheets

SYSTEMS AND METHODS FOR VIRTUAL PRIVATE NETWORK USING WIRELESS NETWORK SLICE

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may implement network slicing techniques, in which different "slices" of the network are associated with different parameters or attributes, such as Quality of Service ("QoS") attributes (e.g., performance thresholds, Service Level Agreements ("SLAs"), or the like). Different network slices may be implemented by discrete sets of physical and/or virtual hardware, may have separate resource allocations, and/or may otherwise be separate from each other. Some entities, such as corporations, universities, etc. may implement information technology ("IT") security policies, such as requiring the use of virtual private networks ("VPNs").

DETAILED DESCRIPTION OF EXAMPLE EMBODIMENTS

The following detailed description refers to the accompanying drawings. The same reference numbers in different drawings may identify the same or similar elements.

Wireless networks may implement network slices, where different network slices are associated with different QoS parameters, are implemented by discrete sets of physical hardware and/or by or separate instances of virtual network functions ("VNFs"), and/or are otherwise separate from each other. In other words, different slices of a given wireless network may be considered as different, separate instances of the wireless network. Embodiments described herein provide a dedicated private network slice via which devices may communicate with each other, thus providing security and privacy features akin to those provided by VPNs, without requiring such devices to implement or configure such VPNs, thus reducing the complexity of operation and deployment of such devices in order to receive the security and privacy features. The devices may be devices that are provided by, managed by, and/or otherwise associated with a particular entity such as a particular company, organization, university, or the like.

Further, as discussed herein, Fixed Wireless Access ("FWA") devices or other suitable devices may be utilized in the providing of the private network slices, thus providing flexibility in the deployment of the private network slice (e.g., without requiring a wired connection between the FWA device and a gateway, modem, etc.). Additionally, client devices that use different types of connection interfaces (e.g., wired or wireless interfaces) may communicate with an FWA device in accordance with some embodiments, and may receive access to a private network slice without needing to be "aware" of the existence of such private network slice. As such, techniques provided herein further allow devices that do not necessarily implement network slice-related operations, such as desktop or laptop computers, tablets, smart home devices, etc., to communicate via a private network slice, as discussed below.

Figure 1:
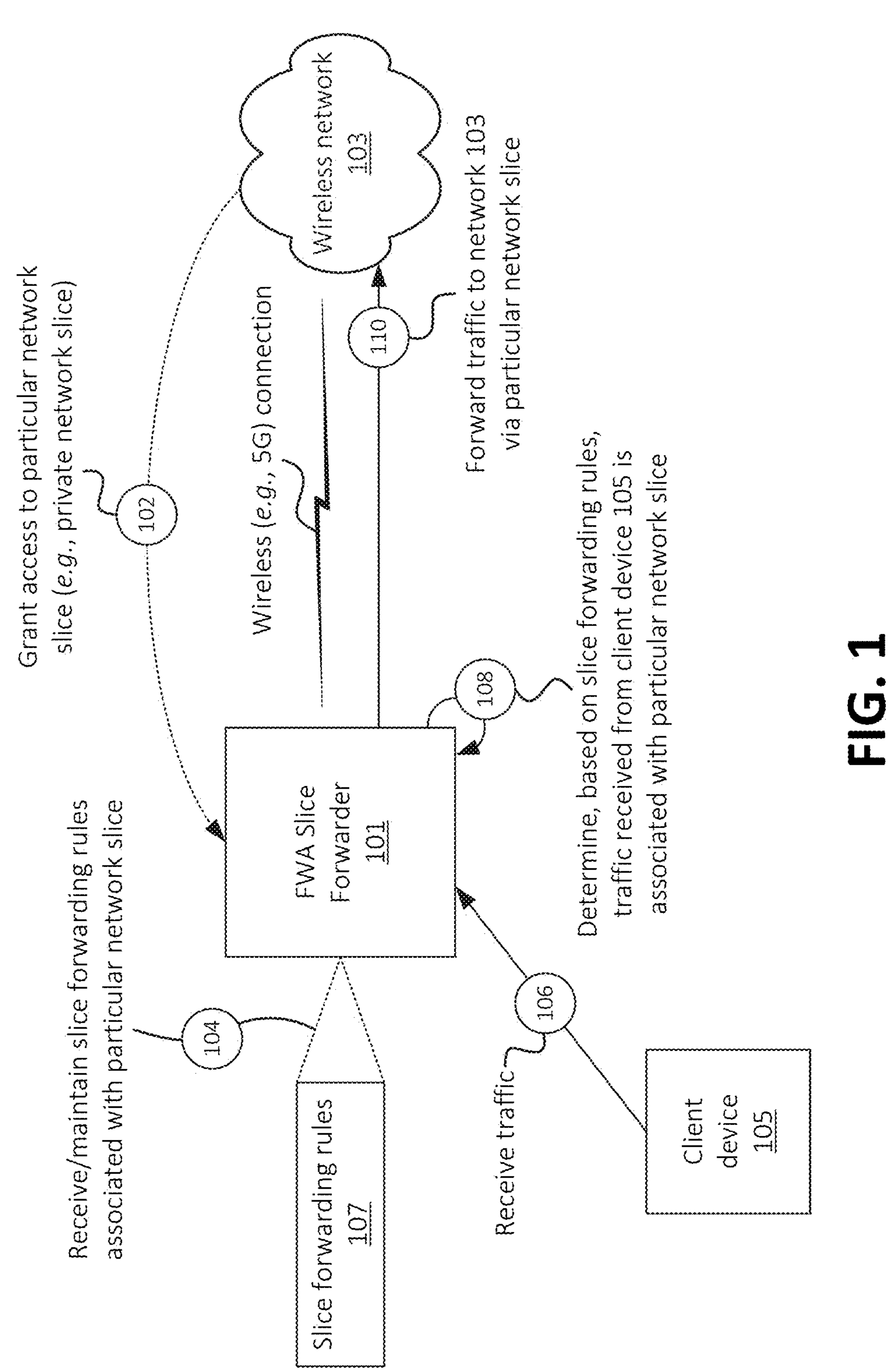
FIG. 1 illustrates an example overview of one or more embodiments described herein.

As shown in FIG. 1, FWA Slice Forwarder ("FSF") 101 may communicate wirelessly with wireless network 103, to provide connectivity to one or more client devices 105. As noted above, FSF 101 may implement one or more wired or wireless interfaces via which client devices 105 may communicate with FSF 101. For example, FSF 101 may include one or more physical ports or jacks (e.g., Ethernet ports, Registered Jack ("RJ")-45 jacks, coaxial jacks, etc.) and/or wireless circuitry that implements a wireless interface (e.g., Wi-Fi circuitry, Bluetooth® circuitry, etc.), via which client devices 105 may communicate with FSF 101. FSF 101 may route traffic, received from wireless network 103, to one or more client devices 105 and may also route traffic, received from one or more client devices 105, to wireless network 103. As discussed herein, routing traffic to wireless network 103 may include routing such traffic via particular network slices, which may include a private network slice that is not accessible to unauthorized devices or entities.

FSF 101 may, in some embodiments, include wireless circuitry such as one or more radios, antennas, etc. that operate at the same radio access technology ("RAT"), frequency, bands, etc. as a RAN of wireless network 103. For example, wireless network 103 may include a RAN that includes one or more base stations (e.g., evolved Node Bs ("eNBs"), Next Generation Node Bs ("gNBs"), etc.), as well as a core network (e.g., an Evolved Packet Core ("EPC"), a Fifth Generation Core ("5GC"), etc.). In the example shown in FIG. 1, FSF 101 communicates with wireless network 103 (e.g., a RAN of wireless network 103) using a 5G RAT. In other examples, FSF 101 may communicate with wireless network 103 via a Long-Term Evolution ("LTE") RAT or some other RAT in addition to, or in lieu of, a 5G RAT. FSF 101 may include or may be associated with a unique identifier (e.g., an International Mobile Station Equipment Identity ("IMEI"), a Subscription Permanent Identifier ("SUPI"), etc.) that is used by wireless network 103 to uniquely identify FSF 101. Additionally, FSF 101 may include a Subscriber Identification Module ("SIM"), a Universal SIM ("USIM"), an embedded SIM ("eSIM"), a Universal Integrated Circuit Card ("UICC"), and/or some other component that performs or otherwise facilitates authentication and/or authorization procedures with wireless network 103.

In some embodiments, the wireless interface provided by FSF 101 for client devices 105 may implement a different RAT than is used by FSF 101 to communicate with a RAN of wireless network 103. For example, FSF 101 may communicate with client devices 105 via an unlicensed RAT such as Wi-Fi, and may communicate with the RAN of wireless network 103 via a licensed RAT such as a 5G RAT, an LTE RAT, etc.

As discussed above, wireless network 103 may implement multiple network slices. In one example embodiment, wireless network 103 may implement one or more "private" network slices that are accessible by FSF 101, but not to other devices. For example, a particular entity (e.g., an owner, operator, administrator, etc. associated with FSF 101) may communicate with an owner, operator, administrator, etc. of wireless network 103 (e.g., a mobile network operator ("MNO")) to associate FSF 101 with a private slice that is provisioned or established by wireless network 103 on behalf of the particular entity.

The entity may provide the identifier (e.g., IMEI, SUPI, etc.) of FSF 101 to wireless network 103, such that wireless network 103 is able to register or otherwise grant (at 102) access, to the particular network slice, to FSF 101. For example, wireless network 103 may maintain information in an information repository (e.g., a Home Subscriber Server ("HSS"), a Unified Data Management function ("UDM"), a Unified Data Repository ("UDR"), etc.) associating the identifier of FSF 101 with an identifier of the particular network slice. In some embodiments, wireless network 103 may notify FSF 101 that FSF 101 has been granted access to the particular network slice. Such notification may be provided as part of an attachment procedure of FSF 101 to a RAN of wireless network 103, via an Over-the-Air ("OTA") update procedure, and/or via some other suitable mechanism. In some embodiments, the notification may be provided in the form of a list of authorized network slices, which may include the particular network slice and one or more other network slices (e.g., one or more "public" network slices, one or more "shared" network slices for which multiple particular entities are authorized, and/or one or more additional "private" network slices for which only FSF 101 or other devices associated with a particular entity are authorized). The list may include identifiers of such network slices, such as Network Slice Selection Assistance Information ("NSSAI") values.

In some embodiments, FSF 101 may further receive and/or maintain (at 104) one or more slice forwarding rules 107, including slice forwarding rules associated with the particular network slice. Slice forwarding rules 107 may include criteria, conditions, rules, policies, etc. based on which FSF 101 may identify traffic that should be output via the particular network slice (e.g., as opposed to another network slice, such as a "public" network slice or some other network slice).

As one example, slice forwarding rules 107 may indicate that traffic associated with a particular application (e.g., traffic that includes the application identifier in header information, and/or which has other attributes based on which the particular application can be identified) should be routed via the particular network slice. As another example, slice forwarding rules 107 may indicate that traffic received from a particular client device 105 (e.g., based on an identifier of such client device 105, such as an Internet Protocol ("IP") address, a device name, a device identifier, a Media Access Control ("MAC") address, etc.) should be routed via the particular network slice.

As another example, slice forwarding rules 107 may indicate that traffic received by FSF 101 via a particular interface or interface type (e.g., via one or more particular Ethernet ports, via a Wi-Fi interface, etc.) should be routed via the particular network slice. For instance, a particular slice forwarding rule 107 may indicate that traffic received by FSF 101 via an Ethernet interface of FSF 101 should be sent to wireless network 103 via the particular network slice, while traffic received by FSF 101 via a Wi-Fi interface should be routed via some other network slice. As another example, a particular slice forwarding rule 107 may indicate that traffic received by FSF 101 via a first Ethernet port of FSF 101 should be sent to wireless network 103 via the particular network slice, while traffic received by FSF 101 via a second Ethernet port should be routed via some other network slice.

As yet another example, slice forwarding rules 107 may indicate that traffic received by FSF 101 from a particular device or device type should be routed via the particular network slice. As one example, a particular slice forwarding rule 107 may indicate that traffic received by FSF 101 from a desktop computer should be routed via the particular network slice, while traffic received by FSF 101 from a smart home device should not be routed via the particular network slice (e.g., should be routed via some other network slice). While example slice forwarding rules 107 are provided above, in practice, slice forwarding rules 107 may include any suitable type of rules, criteria, conditions, etc. based on which FSF 101 may identify traffic to route via a given network slice.

Slice forwarding rules 107 may be received by FSF 101 from an authorized source, such as from an owner and/or operator of FSF 101 and/or one or more client devices 105. Slice forwarding rule 107 may, for example, include or may implement an application programming interface ("API"), a web portal, or some other suitable communication pathway via which FSF 101 may securely receive slice forwarding rule 107 from an authorized and authenticated source. In this sense, in accordance with some embodiments, the owner or operator of FSF 101 may have control over slice forwarding rules 107, rather than implementations in which such rules would be configured and managed by wireless network 103 (e.g., by an MNO of wireless network 103).

At some point, FSF 101 may receive (at 106) traffic from client device 105 (e.g., via a suitable wired or wireless interface between FSF 101 and client device 105). In this example, FSF 101 may determine (at 108), based on slice forwarding rules 107, that the traffic received from client device 105 is associated with the particular network slice. For example, FSF 101 may compare attributes or parameters of the traffic, attributes or parameters of client device 105, and/or other suitable information to slice forwarding rules 107 to determine that the received traffic should be routed via the particular network slice (e.g., as opposed to some other network slice for which FSF 101 is authorized). For example, FSF 101 may determine that attributes of the traffic match attributes indicated in slice forwarding policies 107 for the particular network slice. FSF 101 may accordingly forward (at 110) the traffic to wireless network 103 via the particular network slice. Forwarding (at 110) the traffic to wireless network 103 via the particular network slice may include establishing one or more communication sessions (e.g., protocol data unit ("PDU") sessions, General Packet Radio Service ("GPRS") Tunneling Protocol ("GTP") tunnels, etc.) with wireless network 103, where such communication sessions are associated with the particular network slice.

Figure 2:
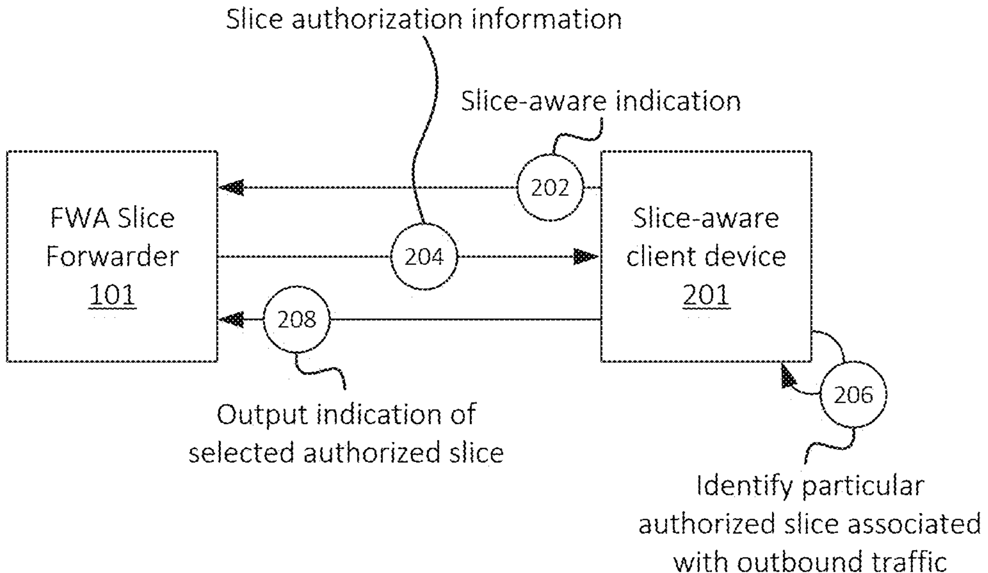
FIG. 2 illustrates an example of providing a slice authorization indication to a slice-aware client device, in accordance with some embodiments.

In some embodiments, a particular client device 105 may specifically request the use of a particular network slice. For example, as shown in FIG. 2, a particular client device may be a slice-aware client device 201. Slice-aware client device 201 may implement an application, an API, etc. that may request a particular network slice for certain traffic, such as traffic associated with a particular application, traffic meeting particular traffic descriptors or attributes, etc. Similarly, in some embodiments, FSF 101 may implement an application, API, etc. that may communicate (at 202) with slice-aware client device 201 in order to ascertain that slice-aware client device 201 is capable of requesting the use of particular network slices for particular traffic. As one example, when connecting to slice-aware client device 201, FSF 101 and/or slice-aware client device 201 (e.g., via the application, API, etc. noted above) may communicate a slice-aware indication that denotes that slice-aware client device 201 is capable of requesting the use of particular network slices for particular traffic.

FSF 101 may accordingly provide (at 204) information indicating one or more network slices for which FSF 101 is authorized (e.g., as received (at 102) from wireless network 103). Slice-aware client device 201 may at some point identify (at 206) that a given network slice should be used for outbound traffic from slice-aware client device 201. For example, slice-aware client device 201 may identify that traffic has been output by a particular application, such as a secure messaging application executing at slice-aware client device 201. In some embodiments, the application itself may include an indicator that the traffic is sensitive or should be sent securely, and based on such indicator slice-aware client device 201 may select a particular authorized network slice (e.g., a private network slice).

In some embodiments, FSF 101 may implement an API or other suitable communication pathway via which the application may indicate that a private network slice should be used for communications associated with the application, and FSF 101 may proceed to select a private network slice for communications associated with such application. That is, the application may not be "aware" of the particular network slice itself (e.g., may not have access to an identifier of the private network slice), but may instead provide an indication (e.g., a sensitive traffic indication, a secure messaging indication, etc.) based on which FSF 101 may select a private network slice.

Slice-aware client device 201 may accordingly output (at 208) an indication of the selected authorized network slice. Slice-aware client device 201 may, for example, output the indication along with outbound traffic, and/or may output the indication prior to receiving such outbound traffic. For example, slice-aware client device 201 may output (at 208) the indication when a particular application is selected or executed at slice-aware client device 201, may output the indication based on one or more temporal or location-based conditions being met, etc. Based on such indication, FSF 101 may request the establishment of a communication session (e.g., a PDU session, a GTP tunnel, etc.) that is associated with the requested network slice. Additionally, or alternatively, FSF 101 may forward outbound traffic via such communication session, such that the outbound traffic is forwarded to wireless network 103 via such network slice.

Figure 3:
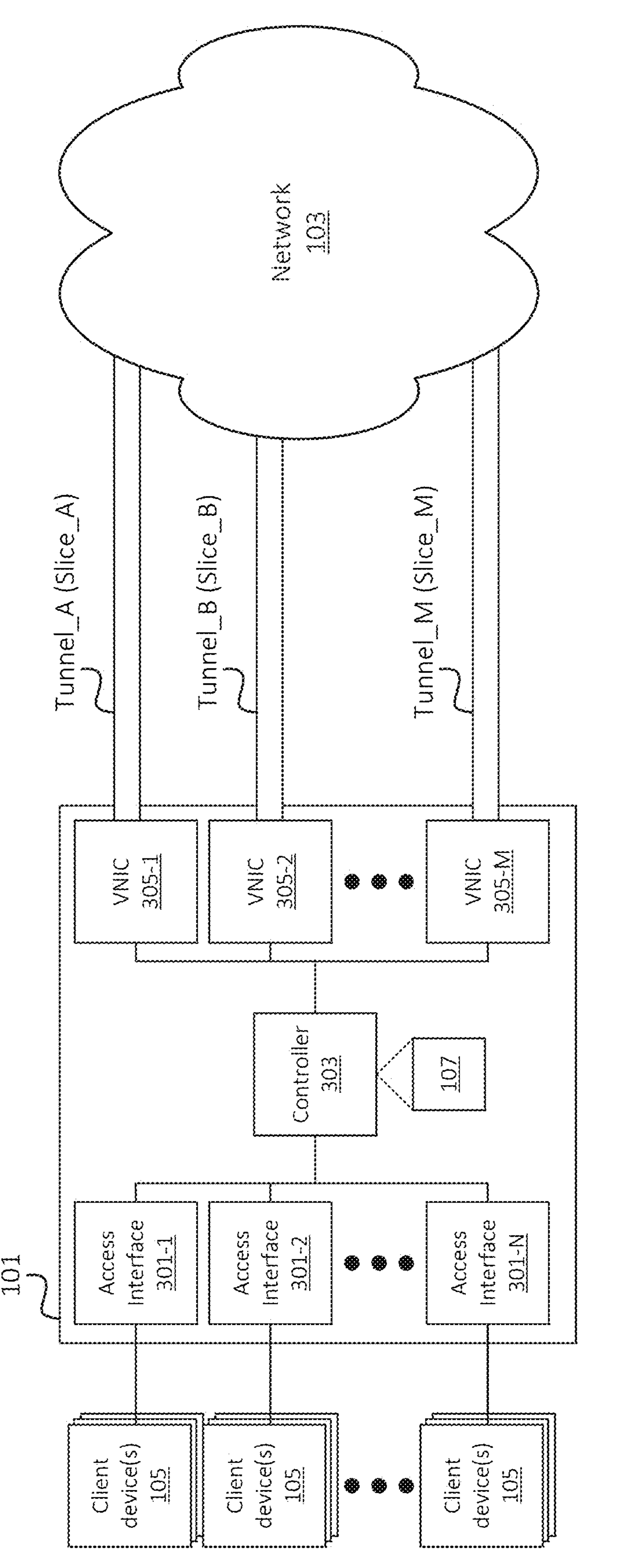
FIG. 3 illustrates example components of one or more devices, in accordance with one or more embodiments described herein.

FIG. 3 illustrates example components of a particular FSF 101. As similarly noted above, FSF 101 may include one or more access interfaces 301 (e.g., access interfaces 301-1, 301-2, 301-N, etc.), via which one or more client devices 105 may communicate with FSF 101. As discussed above, access interfaces 301 may include wired and/or wireless interfaces, such as Ethernet ports, RJ-45 jacks, coaxial jacks, wireless circuitry that implements one or more wireless techniques (e.g., Wi-Fi, Bluetooth®, etc.), or the like. Although FSF 101 is illustrated in this example as having multiple access interfaces 301, in some embodiments, similar concepts may apply for an FSF 101 that includes only a single access interface 301. Further, in some embodiments, although client devices 105 are shown as "directly" connecting to FSF 101 (e.g., via respective access interfaces 301), in practice one or more other network devices (e.g., routers, hubs, switches, customer premises equipment ("CPE"), etc.) may be in a communication pathway between client devices 105 and FSF 101. For example, in some embodiments, FSF 101 may be implemented by a "box" that is connected to a particular network device (e.g., a CPE routing device) that ultimately serves as an interface between FSF 101 and one or more client devices 105.

FSF 101 may include controller 303, which may identify (e.g., based on slice forwarding rules 107) respective network slices with which traffic received from one or more client devices 105 (e.g., via one or more respective access interfaces 301), is associated. For example, as discussed above, controller 303 may analyze attributes of traffic, such as one or more traffic descriptors, application or service identifiers, etc., and/or may analyze other suitable attributes or parameters (e.g., a device type or device identifier of a particular client device 105 from which traffic was received, an indication of a particular access interface 301 or type (e.g., wired, wireless, RJ-45, Wi-Fi, Bluetooth®, etc.) of access interface 301 via which the traffic was received, etc. As such, controller 303 may be able to determine which network slice is associated with diverse traffic received from multiple client devices 105 via multiple access interfaces 301.

FSF 101 may also include one or more interfaces between FSF 101 and network 103, such as virtual network interface cards ("VNICs") 305 (e.g., VNICs 305-1, 305-2, 305-M, etc.). VNICs 305 are discussed as an example implementation of one or more interfaces between FSF 101 and network 103. Specifically, for example, each of these interfaces (e.g., each respective VNIC 305) may serve as an endpoint for communication sessions associated with one or more network slices and wireless network 103. Such communication sessions may include tunnels, such as GTP tunnels. In this example, one GTP tunnel is shown as being associated with one network slice. In practice, one GTP tunnel may be associated with multiple network slices. Similarly, in practice, multiple GTP tunnels may be associated with the same network slice.

In this example, VNIC 305-1 may serve as a first endpoint for a first tunnel (e.g., Tunnel_A which is associated with Slice_A) between FSF 101 and wireless network 103, VNIC 305-2 may serve as a second endpoint for a second tunnel (e.g., Tunnel_B which is associated with Slice_B) between FSF 101 and wireless network 103, and VNIC 305-M may serve as a third endpoint for a third tunnel (e.g., Tunnel_M which is associated with Slice_M) between FSF 101 and wireless network 103. As each VNIC 305 is associated with a different tunnel, each VNIC 305 may include a different endpoint identifier, such as different Tunnel Endpoint Identifiers ("TEIDs"), IP addresses, etc.

As noted above, VNICs 305 represent diverse communication sessions between FSF 101 and wireless network 103, where such communication sessions are used to route traffic according to different network slices. In practice, other mechanisms may be used to route traffic, via different network slices, between FSF 101 and wireless network 103. In some embodiments, multiple VNICs 305 may be implemented by or may otherwise be associated with a single physical interface between FSF 101 and wireless network 103 (e.g., a single fiber or set of fibers, a single physical interface port on FSF 101, etc.). In some embodiments, different VNICs 305 may be implemented by or may otherwise be associated with multiple different physical interfaces between FSF 101 and wireless network 103.

In some embodiments, controller 303 may establish, instantiate, etc. a respective VNIC 305 when determining (e.g., based on slice forwarding rules 107) that a particular tunnel between FSF 101 and wireless network 103 should be established. For example, controller 303 may determine that particular traffic, received from a particular client device 105, is associated with a particular network slice. In some situations, controller 303 may identify that a tunnel for such traffic (e.g., a tunnel associated with the particular network slice) has not yet been established between FSF 101 and wireless network 103, and may accordingly instantiate a respective VNIC 305, via which controller 303 may communicate with wireless network 103 to establish the tunnel associated with the particular network slice. Additionally, or alternatively, controller 303 may utilize VNICs 305 (or other suitable interfaces) provided by FSF 101 without instantiating, creating, etc. such VNICs 305.

Controller 303 may, in some embodiments, maintain a mapping or other suitable information associating particular tunnels and/or VNICs 305 with particular network slices, client devices 105, traffic types, etc. In this manner, controller 303 may be able to route traffic appropriately (e.g., via particular tunnels that are associated with respective network slices) between client devices 105 and wireless network 103.

Figure 4:
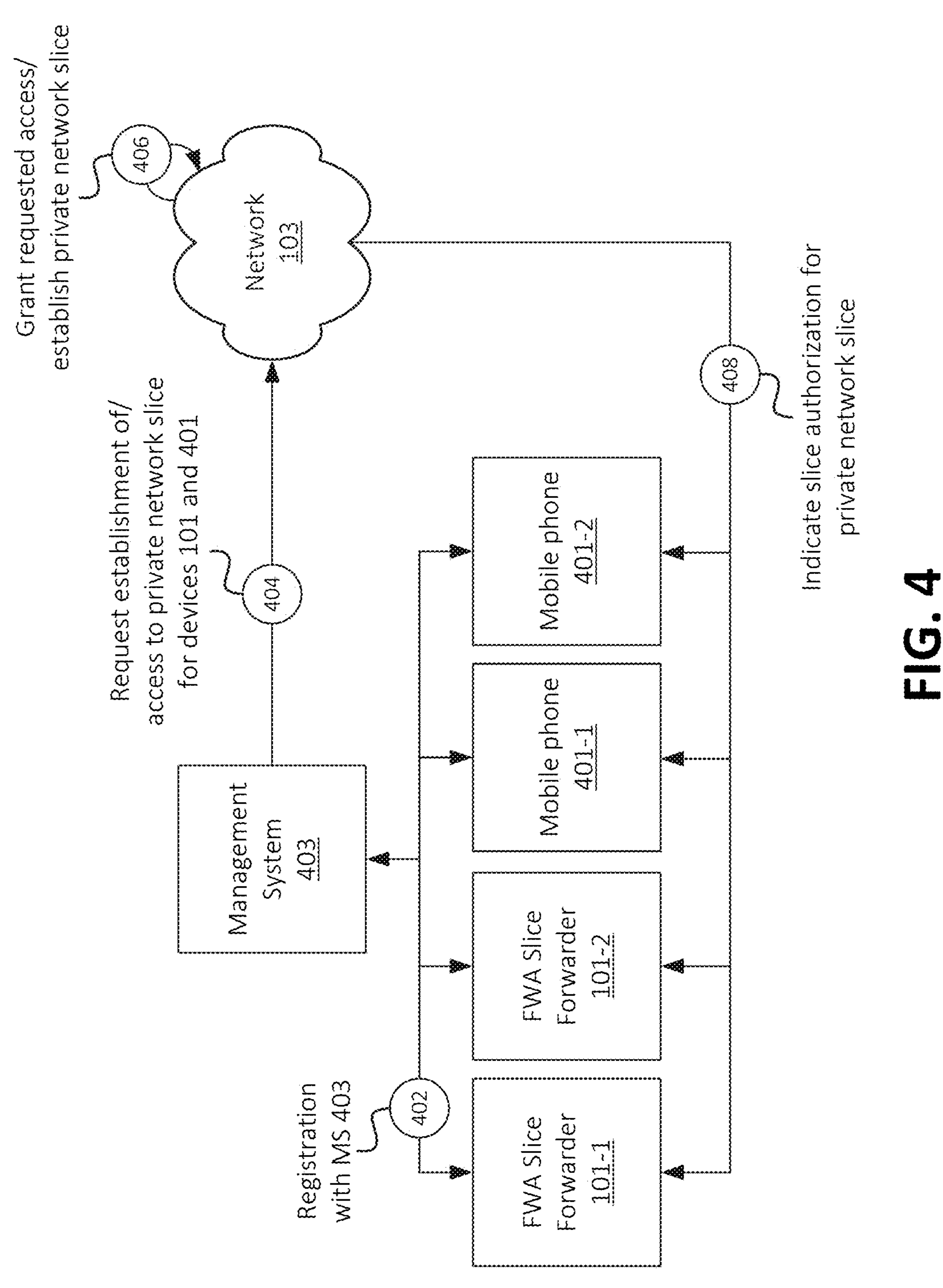
FIG. 4 illustrates an example of an establishment of a private network slice for a set of devices, in accordance with some embodiments.

As shown in FIG. 4, multiple devices, such as multiple FSFs 101 and/or other devices (e.g., mobile phones 401-1, 401-2, etc.) that are associated with the same entity, organization, etc., may be associated with the same particular network slice. Such network slice may be a "private" network slice that is dedicated to the particular entity, organization, etc., such that devices that are not authorized by or otherwise associated with the particular entity may not be able to access the network slice. In this manner, communications between authorized devices associated with the particular entity may be securely separated from communications associated with devices that are outside of the particular entity, thus providing security features of a VPN (e.g., separation of networks) without requiring devices of the entity (e.g., client devices 105) to manually configure a VPN or otherwise be "aware" of VPN setup procedures.

In this example, assume that the particular entity includes or is associated with a particular management system 403, which may be a management or administrator system associated with the particular entity. Further assume that the particular entity includes, deploys, manages, etc. a particular set of devices, such as FSF 101-1, FSF 101-2, mobile phone 401-1, and mobile phone 401-2. FSF 101-1 may, for example, be deployed at a first location (e.g., a first building, facility, geographical region, etc.) in order to provide connectivity (e.g., secure connectivity via a private network slice) to client devices 105 located at the first location, and FSF 101-2 may be deployed at a second location in order to provide connectivity to client devices 105 located at the second location. Further, mobile phones 401-1 and 401-2 may be portable and may be used from the first location, the second location, a third location, etc. For example, mobile phones 401-1 and 401-2 may connect to a RAN of wireless network 103 in order to communicate with wireless network 103.

Management system 403 may register (at 402) the set of devices for which a private network slice is to be provided. For example, an operator, administrator, etc. may communicate with management system 403 via a web portal, an API, a graphical user interface ("GUI"), and/or some other suitable communication pathway to register FSF 101-1, FSF 101-2, mobile phone 401-1, and mobile phone 401-2. Additionally, or alternatively, FSF 101-1, FSF 101-2, mobile phone 401-1, and mobile phone 401-2 may communicate with management system 403 (e.g., via an API, an application, etc.) to perform the registration procedure. Registering (at 402) these devices may include providing or identifying one or more device identifiers or other suitable identifiers of the devices. For example, FSFs 101 and/or mobile phones 401 may be associated with one or more identifiers that have been (or able to be) provisioned, configured, registered, etc. with wireless network 103, such as an IMEI, an International Mobile Subscriber Identity ("IMSI"), a SUPI, a Globally Unique Temporary Identifier ("GUTI"), and/or some other suitable identifier.

Management system 403 may further output (at 404) a request to wireless network 103 (e.g., to a provisioning or management system of wireless network 103, and/or to an external interface device such as a Network Exposure Function ("NEF") or a Service Capability Exposure Function ("SCEF")) to provide a private network slice for FSF 101-1, FSF 101-2, mobile phone 401-1, and mobile phone 401-2. In some embodiments, wireless network 103 may authenticate management system 403 and/or verify that management system 403 is authorized to request a private network slice. In some embodiments, wireless network 103 may verify that a quantity of devices for which the private network slice is being requested (e.g., four devices, in this example) is within a threshold maximum quantity for which management system 403 is authorized to request. In this example, assume that wireless network 103 has determined that management system 403 is authorized to request the private network slice, and may accordingly grant (at 406) the requested network slice. For example, in some embodiments, wireless network 103 may establish the private network slice by performing one or more configuration operations with respect to devices or network functions ("NFs") of wireless network 103 in order to establish the requested network slice.

Additionally, or alternatively, wireless network 103 may identify an existing network slice with which to associate management system 403 and/or the indicated devices (e.g., FSFs 101 and mobile phones 401), and may maintain information indicating that management system 403 and/or the indicated devices are authorized to access such network slice. In some embodiments, the information maintained by wireless network 103 associating management system 403 and/or the indicated devices with the network slice may include associating device identifiers (e.g., IMEIs, IMSIs, SUPIs, GUTIs, etc.) of the indicated devices with a network slice identifier of the particular network slice (e.g., an Network Slice Selection Assistance Information ("NSSAI") value). In some embodiments, wireless network 103 may maintain the information, associating the particular devices with the particular network slice, at an information repository of wireless network 103, such as a UDR, a UDM, an HSS, or the like.

Wireless network 103 may, in some embodiments, provide (at 408) an indication to the devices (e.g., FSF 101-1, FSF 101-2, mobile phone 401-1, and mobile phone 401-2) that the devices are authorized to access the particular network slice (e.g., a private network slice requested by management system 403). For example, wireless network 103 may provide an NSSAI value of the particular network slice or other suitable identifier of such network slice. Wireless network 103 may, for example, provide (at 408) the information as part of an over-the-air ("OTA") update procedure, as part of a wireless connection attachment or modification procedure (e.g., when FSFs 101 and/or mobile phones 401 connect to a RAN of wireless network 103), and/or via some other suitable communication pathway. In this manner, FSF 101-1, FSF 101-2, mobile phone 401-1, and mobile phone 401-2 may be "aware" that such devices are authorized to access the particular network slice. As discussed above, FSF 101-1, FSF 101-2, mobile phone 401-1, and/or mobile phone 401-2 may maintain information (e.g., slice forwarding rules 107) indicating attributes or parameters of traffic to selectively route to wireless network 103 using the particular network slice (e.g., as opposed to other network slices).

Figure 5:
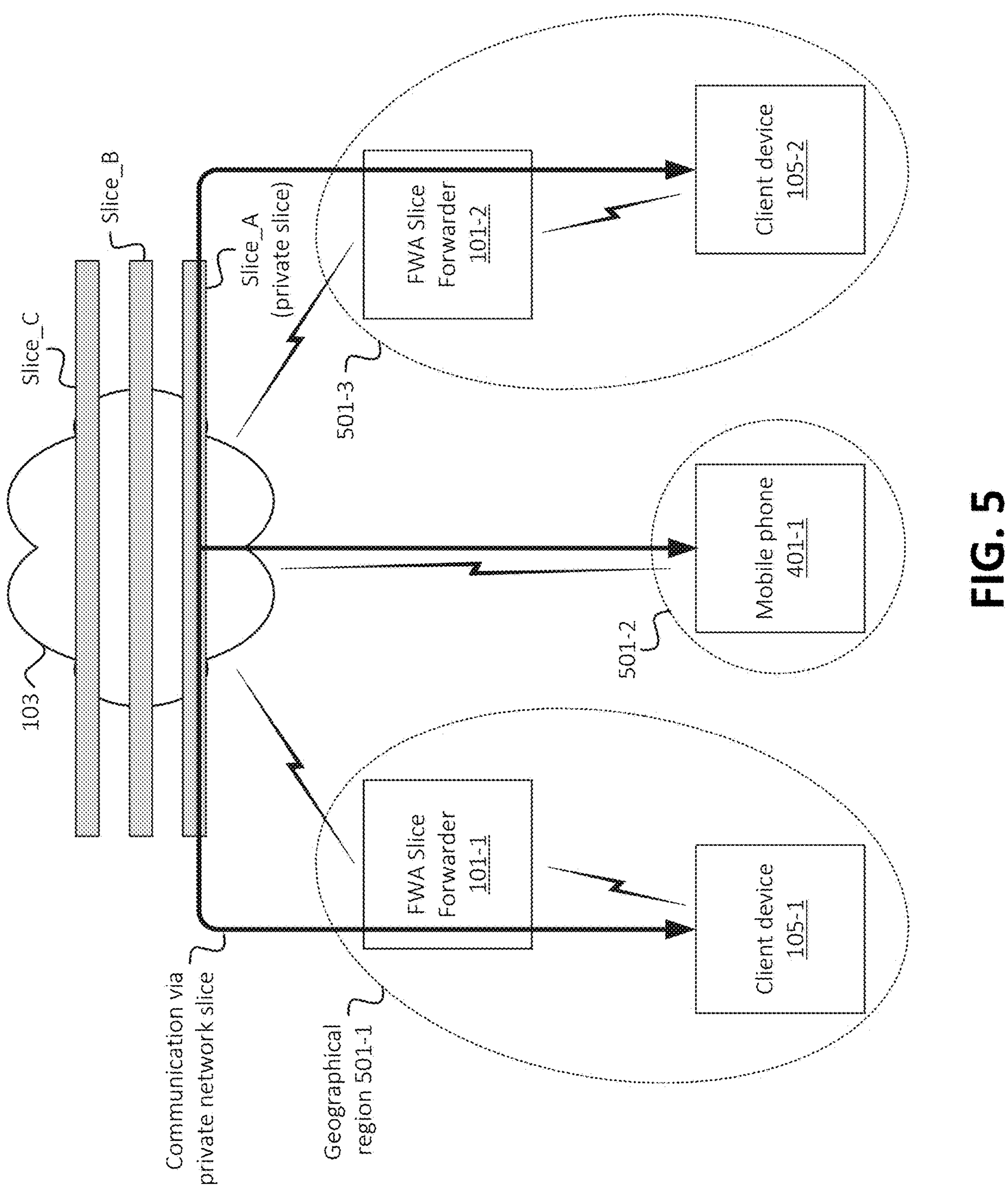
FIG. 5 illustrates secure communications via a private network slice, in accordance with some embodiments.

As one example, FSF 101-1, FSF 101-2, mobile phone 401-1, and mobile phone 401-2 may implement a particular messaging application, and an owner and/or operator of management system 403 may seek to maintain secure communications for the particular messaging application. In this example, slice forwarding rules 107 may indicate that traffic associated with the particular messaging application should be routed via a private network slice (e.g., as opposed to a "public" network slice), such as the network slice requested (at 404) by management system 403. As shown in FIG. 5, the private network slice (e.g., shown as Slice_A) for these devices may be used for communications between the devices (e.g., communications determined by the devices as being associated with the private network slice, such as communications associated the particular messaging application), even when the devices are located in diverse geographical regions 501.

Specifically, for instance, FSF 101-1 may be located in a first geographical region 501-1, mobile phone 401-1 may be located in a second geographical region 501-2, and FSF 101-2 may be located in a third geographical region 501-3. Further, in this example, assume that FSF 101-1 provides connectivity (e.g., via a particular access interface 301) to a first client device 105-1, and that FSF 101-2 provides connectivity to a second client device 105-2. In this example, assume that client devices 105-1 and 105-2 both execute the particular messaging application, and accordingly output traffic to FSFs 101-1 and 101-2, respectively, that is associated with such messaging application (e.g., ultimately for forwarding via wireless network 103).

As such, FSFs 101-1 and 101-2, as well as mobile phone 401-1, may communicate (e.g., with each other) via the particular network slice, such as by identifying traffic associated with the particular messaging application and routing such traffic via the private network slice (e.g., Slice_A), as opposed to one or more other network slices implemented by wireless network 103 (e.g., Slice_B and/or Slice_C). That is, in some situations, FSFs 101-1 and 101-2 and/or mobile phone 401-1 may have access to Slice_B and/or Slice_C, but may select Slice_A for communications associated with the particular messaging application (e.g., based on slice forwarding rules 107).

Figure 6:
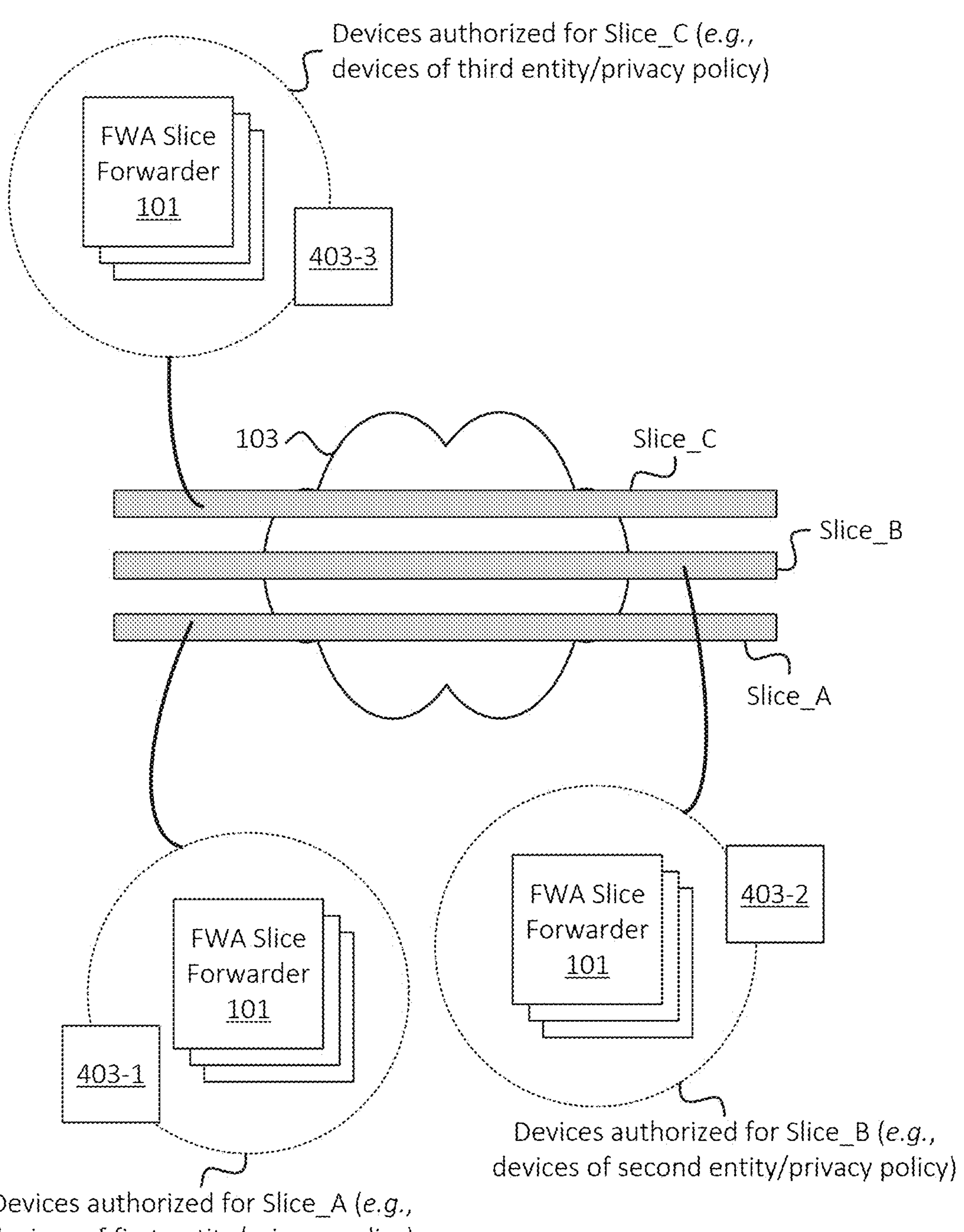
FIG. 6 illustrates an example of different private network slices for which separate sets of devices are authorized, in accordance with some embodiments.

Additionally, or alternatively, as shown in FIG. 6, the other network slices (e.g., Slice_B and Slice_C) may not be accessible to the devices shown in FIGS. 4 and 5. For example, Slice_A may be a private network slice for which a first management system 403-1 (as well as a corresponding set of devices such as one or more FSFs 101) is authorized, Slice_B may be a private network slice for which a second management system 403-1 (as well as a corresponding set of devices such as one or more FSFs 101) is authorized, and Slice_C may be a private network slice for which a third management system 403-1 (as well as a corresponding set of devices such as one or more FSFs 101) is authorized. In some embodiments, management system 403-1 may not be "aware" of Slice_B and Slice_C, management system 403-2 may not be "aware" of Slice_A and Slice_C, and management system 403-3 may not be "aware" of Slice_A and Slice_B, thus maintaining separation of routing paths for discrete groups of devices. In this sense, Slice_A may be reserved, allocated, provisioned, etc. for management system 403-1 and/or a first set of devices that correspond to management system 403-1, Slice_B may be reserved, allocated, provisioned, etc. for management system 403-2 and/or a second set of devices that correspond to management system 403-2, and Slice_C may be reserved, allocated, provisioned, etc. for management system 403-3 and/or a first set of devices that correspond to management system 403-3.

As another example, multiple slices may be associated with the same particular management system 403 (e.g., may be associated with the same organization, administrator, or other entity), which may authorize different sets of FSFs 101 to access different slices. For example, a particular privacy policy administered by management system 403 may specify that a first set of FSFs 101 are authorized to access a first network slice (e.g., Slice_A), and may further specify that a second set of FSFs 101 are authorized to access a second network slice (e.g., Slice_B). In some situations, the first and second sets of FSFs 101 may be exclusive, inasmuch as no individual FSF 101 is in both the first set and the second set. In other situations, one or more FSFs 101 may be in both the first set and the second set. Based on the privacy policy, such management system 403 may provide, to the first set of FSFs 101, access to the first network slice and may further provide, to the second set of FSFs 101, access to the second network slice. As one example, an administrator or operator associated with management system 403 may specify that FSFs 101 located at a first geographical location are in the first set and that FSFs 101 located at a second geographical location are in the second set.

Figure 7:
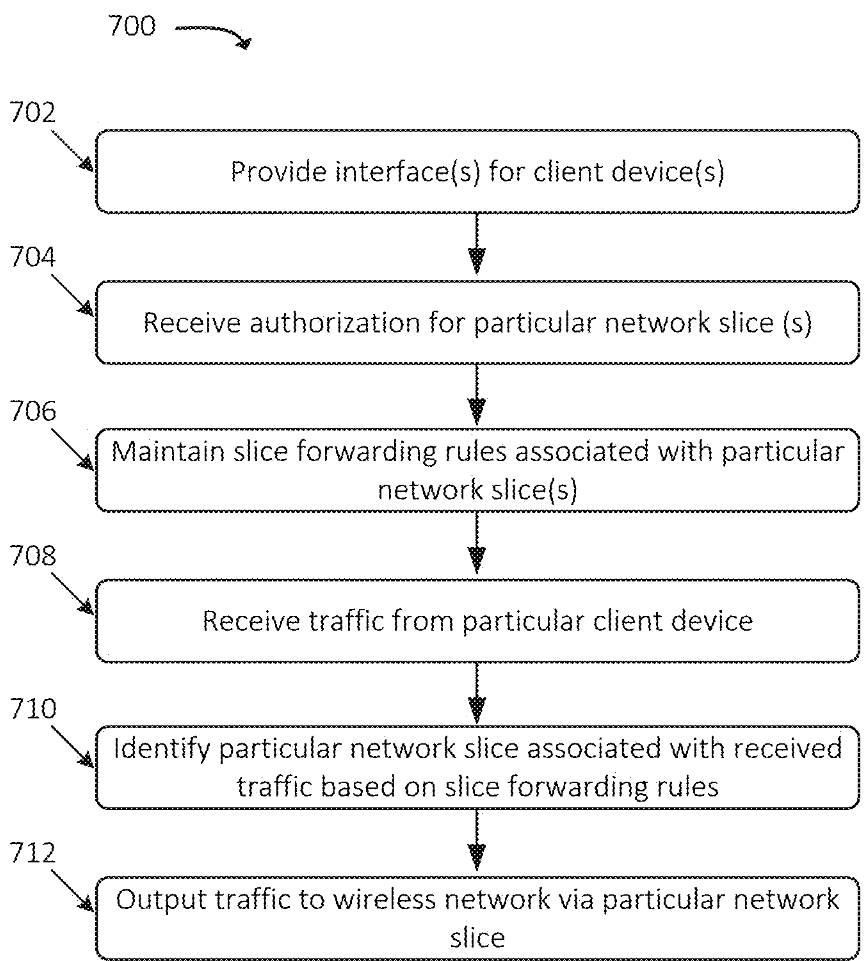
FIG. 7 illustrates an example process for providing connectivity to a wireless network via a private network slice, in accordance with some embodiments.

FIG. 7 illustrates an example process 700 for providing connectivity to wireless network 103 via a private network slice. In some embodiments, some or all of process 700 may be performed by FSF 101. In some embodiments, one or more other devices may perform some or all of process 700 in concert with, and/or in lieu of, FSF 101.

As shown, process 700 may include providing (at 702) a set of interfaces via which one or more client devices may communicate with FSF 101. For example, as discussed above, FSF 101 may include one or more access interfaces 301 via which one or more client devices 105 may communicate with FSF 101. As discussed above, access interfaces 301 may include wired and/or wireless interfaces. In some embodiments, one or more access interfaces 301 may implement a different RAT than a RAT used by FSF 101 to communicate with wireless network 103. For example, FSF 101 may wirelessly communicate with a RAN of wireless network 103 via a licensed RAT such as an LTE RAT or a 5G RAT, and may wirelessly communicate with one or more client devices 105 via an unlicensed RAT such as a Wi-Fi RAT or a Bluetooth® RAT. As discussed above, in some embodiments, FSF 101 may include, may be communicatively coupled to, or may otherwise be associated with a FWA device or some other suitable device that is able to wirelessly communicate with a RAN of wireless network 103.

Process 700 may further include receiving (at 704) authorization to access one or more particular network slices. For example, as discussed above, FSF 101 may receive an indication that FSF 101 has been authorized to access a private network slice that has been established on behalf of FSF 101 and/or one or more other devices. For example, an owner, operator, administrator, etc. may have communicated with a provisioning or management system of wireless network 103 to gain access to the one or more network slices for FSF 101 and/or other devices. As discussed above, some or all of such network slices may be private network slices that were established based on a request to establish private, dedicated network slices that are only accessible to particular devices, such as FSF 101.

Process 700 may additionally include maintaining (at 706) slice forwarding rules associated with some or all of the particular network slices. For example, as discussed above, FSF 101 may receive or maintain slice forwarding rules 107, indicating attributes of traffic or other suitable criteria based on which FSF 101 is able to identify particular network slices with which particular traffic is associated.

Process 700 may also include receiving (at 708) traffic from a particular client device. For example, FSF 101 may receive, via a particular access interface 301, traffic from a particular client device 105. In some embodiments, the traffic may not include a request for a specific network slice. On the other hand, in some embodiments, the traffic may include a request for a specific network slice. For example, as discussed above, a particular slice-aware client device 201 may receive slice authorization information indicating network slices for which FSF 101 is authorized, and may request access to a particular network slice based on such slice authorization information.

Process 700 may further include identifying (at 710) a particular network slice associated with the received traffic. For example, FSF 101 may compare one or more attributes of the traffic, one or more attributes of client device 105, one or more attributes of access interface 301 via which the traffic was received, and/or other suitable information to slice forwarding rules 107. In some embodiments, FSF 101 may identify a request, from client device 105, for access to a specific network slice. Based on comparing the attributes of the traffic to slice forwarding rules 107, and/or based on the request from client device 105 for a specific network slice, FSF 101 may select a particular network slice via which the traffic should be forwarded to wireless network 103.

Process 700 may additionally include outputting (at 712) the traffic to wireless network 103 via the particular network slice. For example, as discussed above, FSF 101 may utilize a particular tunnel (e.g., a GTP tunnel) that is associated with the network slice. In some embodiments, FSF 101 may add header information, markings, etc. to the traffic to indicate the particular network slice. As discussed above, in situations where multiple devices communicate via the particular network slice (e.g., multiple devices may perform some or all of operations 702-712), the communications may be securely separated from the routing of other traffic (e.g., associated with non-authorized devices) via other network slices of wireless network 103. In this manner, the private network slice may serve as a pseudo-VPN, at least inasmuch as the routing of traffic via the private network slice is independent and separate from other network slices of wireless network 103.

Figure 8:
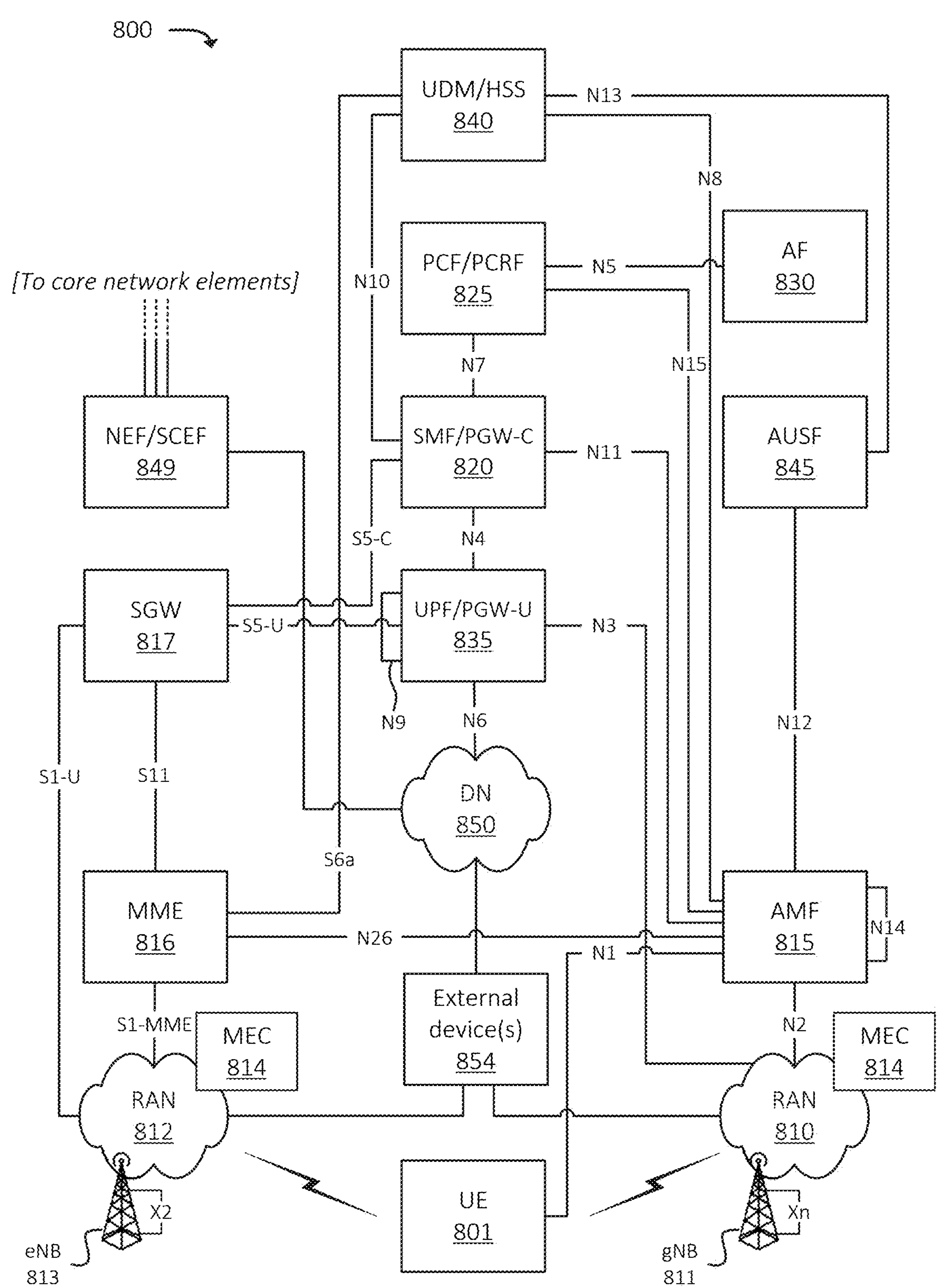
FIGS. 8 and 9 illustrate example environments in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 800 may include UE 801, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Unified Data Management ("UDM")/Home Subscriber Server ("HSS") 840, Authentication Server Function ("AUSF") 845, and NEF/SCEF 849. Environment 800 may also include one or more networks, such as Data Network ("DN") 850. Environment 800 may include one or more additional devices or systems communicatively coupled to one or more networks (e.g., DN 850), such as one or more external devices 854.

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of AMF 815, SMF/PGW-C 820, PCF/PCRF 825, and/or UPF/PGW-U 835, while another slice may include a second instance of AMF 815, SMF/PGW-C 820, PCF/PCRF 825, and/or UPF/PGW-U 835). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Additionally, one or more elements of environment 800 may be implemented in a virtualized and/or containerized manner. For example, one or more of the elements of environment 800 may be implemented by one or more Virtualized Network Functions ("VNFs"), Cloud-Native Network Functions ("CNFs"), etc. In such embodiments, environment 800 may include, may implement, and/or may be communicatively coupled to an orchestration platform that provisions hardware resources, installs containers or applications, performs load balancing, and/or otherwise manages the deployment of such elements of environment 800. In some embodiments, such orchestration and/or management of such elements of environment 800 may be performed by, or in conjunction with, the open-source Kubernetes® API or some other suitable virtualization, containerization, and/or orchestration system.

Elements of environment 800 may interconnect with each other and/or other devices via wired connections, wireless connections, or a combination of wired and wireless connections. Examples of interfaces or communication pathways between the elements of environment 800, as shown in FIG. 8, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 8, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 800 may be, may include, may be implemented by, and/or may be communicatively coupled to wireless network 103.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), an FWA device, or another type of mobile computation and communication device. UE 801 may send traffic to and/or receive traffic (e.g., user plane traffic) from DN 850 via RAN 810, RAN 812, and/or UPF/PGW-U 835. In some embodiments, UE 801 may include, may implement, may be communicatively coupled to, and/or may otherwise be associated with FSF 101, slice-aware client device 201, and/or mobile phone 401.

RAN 810 may be, or may include, a 5G RAN that implements a 5G RAT and that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., user plane traffic such as voice call traffic, data traffic, messaging traffic, etc.) from UE 801 via the air interface, and may communicate the traffic to UPF/PGW-U 835 and/or one or more other devices or networks. Further, RAN 810 may receive signaling traffic, control plane traffic, etc. from UE 801 via the air interface, and may communicate such signaling traffic, control plane traffic, etc. to AMF 815 and/or one or more other devices or networks. Additionally, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, an LTE RAN that implements an LTE RAT and that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 812 may receive traffic (e.g., user plane traffic such as voice call traffic, data traffic, messaging traffic, signaling traffic, etc.) from UE 801 via the air interface, and may communicate the traffic to UPF/PGW-U 835 (e.g., via SGW 817) and/or one or more other devices or networks. Further, RAN 812 may receive signaling traffic, control plane traffic, etc. from UE 801 via the air interface, and may communicate such signaling traffic, control plane traffic, etc. to MME 816 and/or one or more other devices or networks. Additionally, RAN 812 may receive traffic intended for UE 801 (e.g., from UPF/PGW-U 835, MME 816, SGW 817, and/or one or more other devices or networks) and may communicate the traffic to UE 801 via the air interface.

One or more RANs of environment 800 (e.g., RAN 810 and/or RAN 812) may include, may implement, and/or may otherwise be communicatively coupled to one or more edge computing devices, such as one or more Multi-Access/Mobile Edge Computing ("MEC") devices (referred to sometimes herein simply as a "MECs") 814. MECs 814 may be co-located with wireless network infrastructure equipment of RANs 810 and/or 812 (e.g., one or more gNBs 811 and/or one or more eNBs 813, respectively). Additionally, or alternatively, MECs 814 may otherwise be associated with geographical regions (e.g., coverage areas) of wireless network infrastructure equipment of RANs 810 and/or 812. In some embodiments, one or more MECs 814 may be implemented by the same set of hardware resources, the same set of devices, etc. that implement wireless network infrastructure equipment of RANs 810 and/or 812. In some embodiments, one or more MECs 814 may be implemented by different hardware resources, a different set of devices, etc. from hardware resources or devices that implement wireless network infrastructure equipment of RANs 810 and/or 812. In some embodiments, MECs 814 may be communicatively coupled to wireless network infrastructure equipment of RANs 810 and/or 812 (e.g., via a high-speed and/or low-latency link such as a physical wired interface, a high-speed and/or low-latency wireless interface, or some other suitable communication pathway).

MECs 814 may include hardware resources (e.g., configurable or provisionable hardware resources) that may be configured to provide services and/or otherwise process traffic to and/or from UE 801, via RAN 810 and/or 812. For example, RAN 810 and/or 812 may route some traffic from UE 801 (e.g., traffic associated with one or more particular services, applications, application types, etc.) to a respective MEC 814 instead of to core network elements of 800 (e.g., UPF/PGW-U 835). MEC 814 may accordingly provide services to UE 801 by processing such traffic, performing one or more computations based on the received traffic, and providing traffic to UE 801 via RAN 810 and/or 812. MEC 814 may include, and/or may implement, some or all of the functionality described above with respect to UPF/PGW-U 835, AF 830, one or more application servers, and/or one or more other devices, systems, VNFs, CNFs, etc. In this manner, ultra-low latency services may be provided to UE 801, as traffic does not need to traverse links (e.g., backhaul links) between RAN 810 and/or 812 and the core network.

AMF 815 may include one or more devices, systems, VNFs, CNFs, etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple instances of UPF/PGW-U 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, RAN 812, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. In some embodiments, UDM/HSS 840 may include, may implement, may be communicatively coupled to, and/or may otherwise be associated with some other type of repository or database, such as a UDR. AUSF 845 and/or UDM/HSS 840 may perform authentication, authorization, and/or accounting operations associated with one or more UEs 801 and/or one or more communication sessions associated with one or more UEs 801.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

External devices 854 may include one or more devices or systems that communicate with UE 801 via DN 850 and one or more elements of 800 (e.g., via UPF/PGW-U 835). In some embodiments, external devices 854 may include, may implement, and/or may otherwise be associated with management system 403. External devices 854 may include, for example, one or more application servers, content provider systems, web servers, or the like. External devices 854 may, for example, implement "server-side" applications that communicate with "client-side" applications executed by UE 801. External devices 854 may provide services to UE 801 such as gaming services, videoconferencing services, messaging services, email services, web services, and/or other types of services.

In some embodiments, external devices 854 may communicate with one or more elements of environment 800 (e.g., core network elements) via NEF/SCEF 849. NEF/SCEF 849 include one or more devices, systems, VNFs, CNFs, etc. that provide access to information, APIs, and/or other operations or mechanisms of one or more core network elements to devices or systems that are external to the core network (e.g., to external device 854 via DN 850). NEF/SCEF 849 may maintain authorization and/or authentication information associated with such external devices or systems, such that NEF/SCEF 849 is able to provide information, that is authorized to be provided, to the external devices or systems. For example, a given external device 854 may request particular information associated with one or more core network elements. NEF/SCEF 849 may authenticate the request and/or otherwise verify that external device 854 is authorized to receive the information, and may request, obtain, or otherwise receive the information from the one or more core network elements. In some embodiments, NEF/SCEF 849 may include, may implement, may be implemented by, may be communicatively coupled to, and/or may otherwise be associated with a Security Edge Protection Proxy ("SEPP"), which may perform some or all of the functions discussed above. External device 854 may, in some situations, subscribe to particular types of requested information provided by the one or more core network elements, and the one or more core network elements may provide (e.g., "push") the requested information to NEF/SCEF 849 (e.g., in a periodic or otherwise ongoing basis).

In some embodiments, external devices 854 may communicate with one or more elements of RAN 810 and/or 812 via an API or other suitable interface. For example, a given external device 854 may provide instructions, requests, etc. to RAN 810 and/or 812 to provide one or more services via one or more respective MECs 814. In some embodiments, such instructions, requests, etc. may include QoS parameters, Service Level Agreements ("SLAs"), etc. (e.g., maximum latency thresholds, minimum throughput thresholds, etc.) associated with the services.

Figure 9:
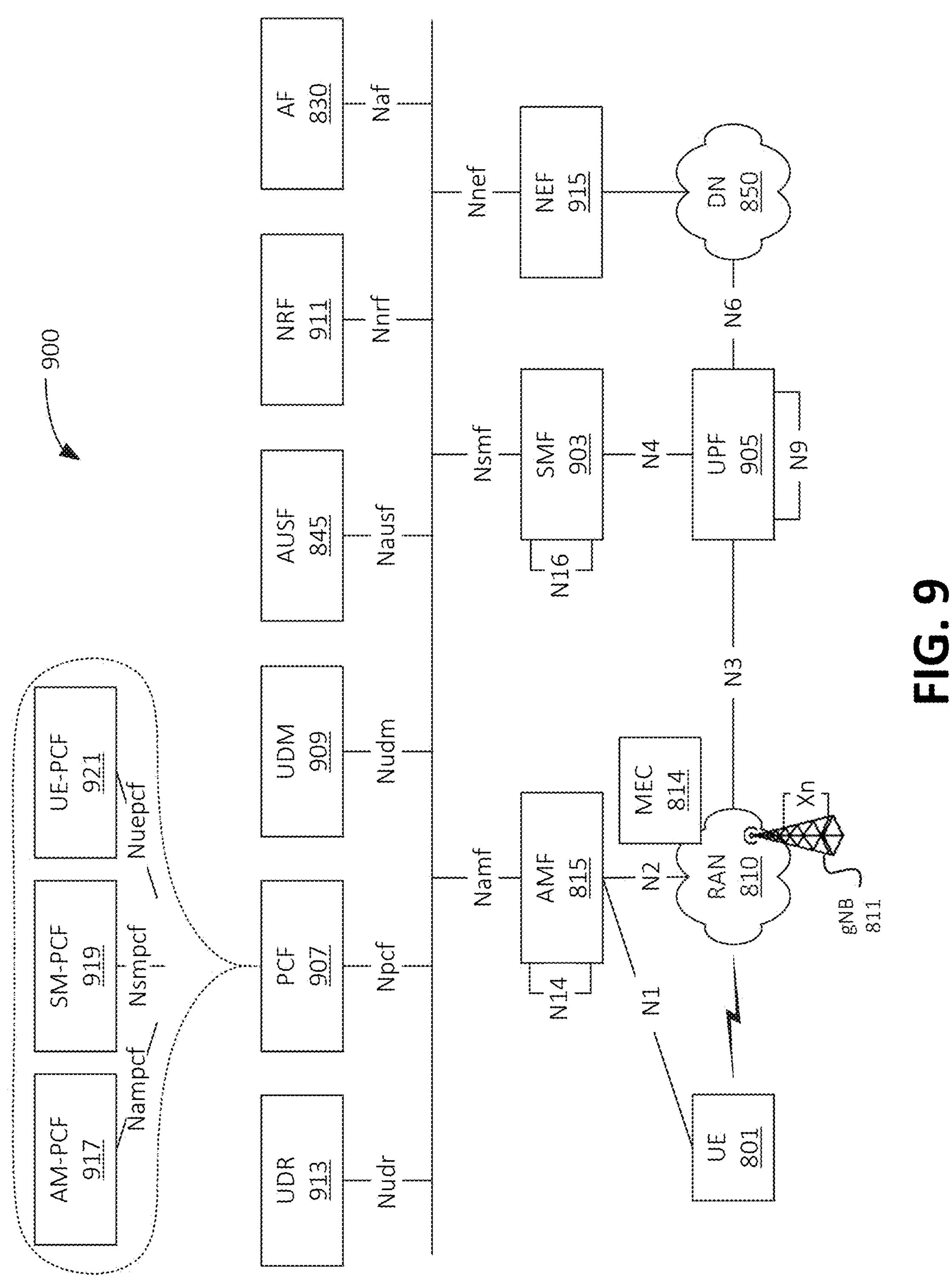

FIG. 9 illustrates another example environment 900, in which one or more embodiments may be implemented. In some embodiments, environment 900 may correspond to a 5G network, and/or may include elements of a 5G network. In some embodiments, environment 900 may correspond to a 5G SA architecture. In some embodiments, environment 900 may include a 5GC, in which 5GC network elements perform one or more operations described herein.

As shown, environment 900 may include UE 801, RAN 810 (which may include one or more gNBs 811 or other types of wireless network infrastructure) and various network functions, which may be implemented as VNFs, CNFs, etc. Such network functions may include AMF 815, SMF 903, UPF 905, PCF 907, UDM 909, AUSF 845, Network Repository Function ("NRF") 911, AF 830, UDR 913, and NEF 915. Environment 900 may also include or may be communicatively coupled to one or more networks, such as DN 850.

The example shown in FIG. 9 illustrates one instance of each network component or function (e.g., one instance of SMF 903, UPF 905, PCF 907, UDM 909, AUSF 845, etc.). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF 903, PCF 907, UPF 905, etc., while another slice may include a second instance of SMF 903, PCF 907, UPF 905, etc.). Additionally, or alternatively, one or more of the network functions of environment 900 may implement multiple network slices. The different slices may provide differentiated levels of service, such as service in accordance with different QoS parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900.

Elements of environment 900 may interconnect with each other and/or other devices via wired connections, wireless connections, or a combination of wired and wireless connections. Examples of interfaces or communication pathways between the elements of environment 900, as shown in FIG. 9, may include interfaces shown in FIG. 9 and/or one or more interfaces not explicitly shown in FIG. 9. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 900 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 815), an Nudm interface (e.g., indicating communications to be routed to UDM 909), an Npcf interface, an Nupf interface, an Nnef interface, an Nsmf interface, an Nnrf interface, an Nudr interface, an Naf interface, and/or one or more other SBIs. In some embodiments, environment 900 may be, may include, may be implemented by, and/or may be communicatively coupled to wireless network 103.

UPF 905 may include one or more devices, systems, VNFs, CNFs, etc., that receive, route, process, and/or forward traffic (e.g., user plane traffic). As discussed above, UPF 905 may communicate with UE 801 via one or more communication sessions, such as PDU sessions. Such PDU sessions may be associated with a particular network slice or other suitable QoS parameters, as noted above. UPF 905 may receive downlink user plane traffic (e.g., voice call traffic, data traffic, etc. destined for UE 801) from DN 850, and may forward the downlink user plane traffic toward UE 801 (e.g., via RAN 810). In some embodiments, multiple UPFs 905 may be deployed (e.g., in different geographical locations), and the delivery of content to UE 801 may be coordinated via the N9 interface. Similarly, UPF 905 may receive uplink traffic from UE 801 (e.g., via RAN 810), and may forward the traffic toward DN 850. In some embodiments, UPF 905 may implement, may be implemented by, may be communicatively coupled to, and/or may otherwise be associated with UPF/PGW-U 835. In some embodiments, UPF 905 may communicate (e.g., via the N4 interface) with SMF 903, regarding user plane data processed by UPF 905 (e.g., to provide analytics or reporting information, to receive policy and/or authorization information, etc.).

PCF 907 may include one or more devices, systems, VNFs, CNFs, etc., that aggregate, derive, generate, etc. policy information associated with the 5GC and/or UEs 801 that communicate via the 5GC and/or RAN 810. PCF 907 may receive information regarding policies and/or subscriptions from one or more sources, such as subscriber databases (e.g., UDM 909, UDR 913, etc.), and/or from one or more users such as, for example, an administrator associated with PCF 907. In some embodiments, the functionality of PCF 907 may be split into multiple network functions or subsystems, such as access and mobility PCF ("AM-PCF") 917, session management PCF ("SM-PCF") 919, UE PCF ("UE-PCF") 921, and so on. Such different "split" PCFs may be associated with respective SBIs (e.g., AM-PCF 917 may be associated with an Nampcf SBI, SM-PCF 919 may be associated with an Nsmpcf SBI, UE-PCF 921 may be associated with an Nuepcf SBI, and so on) via which other network functions may communicate with the split PCFs. The split PCFs may maintain information regarding policies associated with different devices, systems, and/or network functions.

NRF 911 may include one or more devices, systems, VNFs, CNFs, etc. that maintain routing and/or network topology information associated with the 5GC. For example, NRF 911 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 913 may include one or more devices, systems, VNFs, CNFs, etc. that provide user and/or subscriber information, based on which PCF 907 and/or other elements of environment 900 may determine access policies, QoS policies, charging policies, or the like. In some embodiments, UDR 913 may receive such information from UDM 909 and/or one or more other sources.

NEF 915 include one or more devices, systems, VNFs, CNFs, etc. that provide access to information, APIs, and/or other operations or mechanisms of the 5GC to devices or systems that are external to the 5GC. NEF 915 may maintain authorization and/or authentication information associated with such external devices or systems, such that NEF 915 is able to provide information, that is authorized to be provided, to the external devices or systems. Such information may be received from other network functions of the 5GC (e.g., as authorized by an administrator or other suitable entity associated with the 5GC), such as SMF 903, UPF 905, a charging function ("CHF") of the 5GC, and/or other suitable network function. NEF 915 may communicate with external devices or systems (e.g., external devices 854) via DN 850 and/or other suitable communication pathways.

While environment 900 is described in the context of a 5GC, as noted above, environment 900 may, in some embodiments, include or implement one or more other types of core networks. For example, in some embodiments, environment 900 may be or may include a converged packet core, in which one or more elements may perform some or all of the functionality of one or more 5GC network functions and/or one or more EPC network functions. For example, in some embodiments, AMF 815 may include, may implement, may be implemented by, and/or may otherwise be associated with MME 816; SMF 903 may include, may implement, may be implemented by, and/or may otherwise be associated with SGW 817; PCF 907 may include, may implement, may be implemented by, and/or may otherwise be associated with a PCRF (e.g., PCF/PCRF 825); NEF 915 may include, may implement, may be implemented by, and/or may otherwise be associated with a SCEF (e.g., NEF/SCEF 849); and so on.

Figure 10:
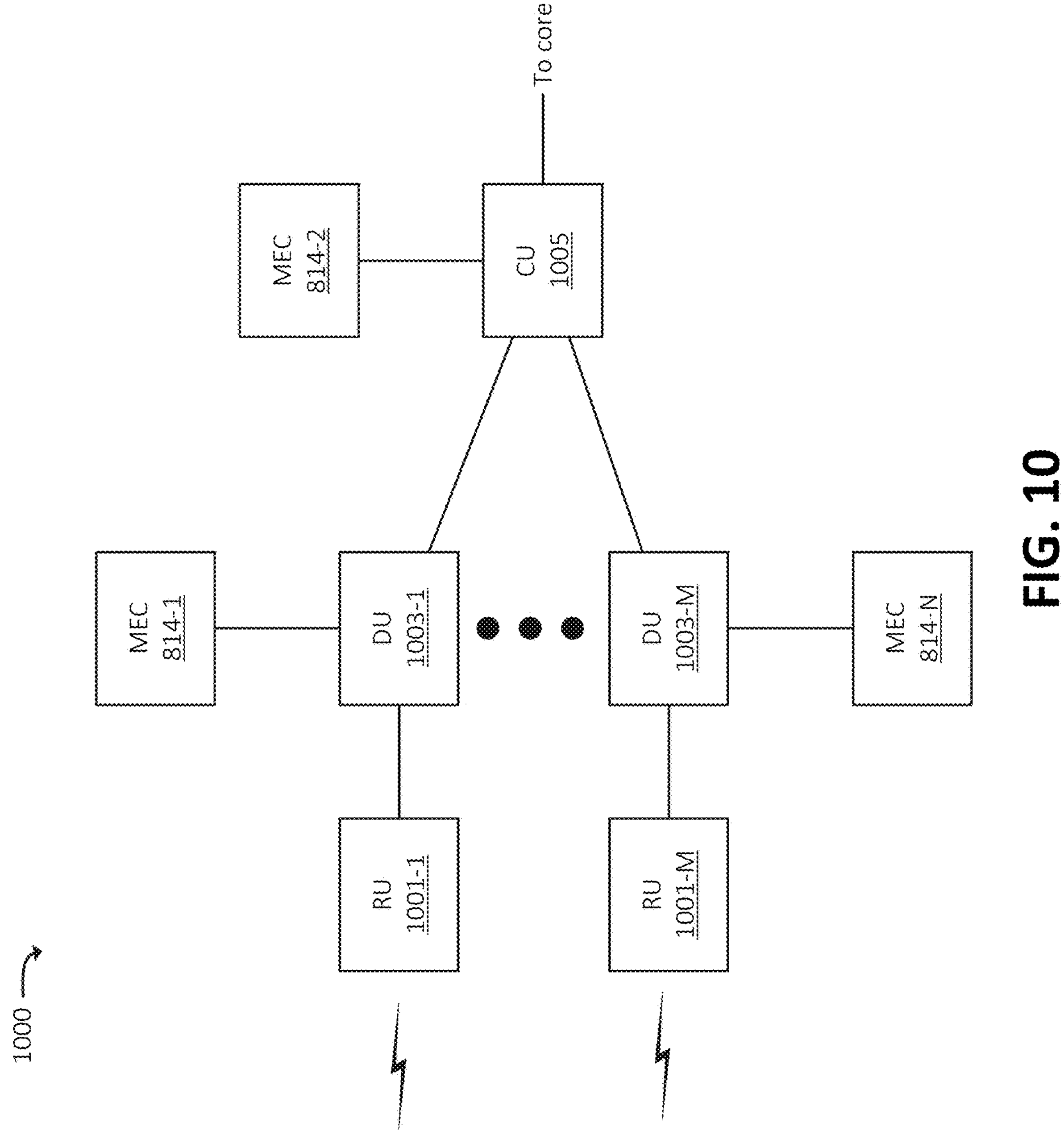
FIG. 10 illustrates an example arrangement of a radio access network ("RAN"), in accordance with some embodiments.

FIG. 10 illustrates an example RAN environment 1000, which may be included in and/or implemented by one or more RANs (e.g., RAN 810 or some other RAN). In some embodiments, a particular RAN 810 may include one RAN environment 1000. In some embodiments, a particular RAN 810 may include multiple RAN environments 1000. In some embodiments, RAN environment 1000 may correspond to a particular gNB 811 of RAN 810. In some embodiments, RAN environment 1000 may correspond to multiple gNBs 811. In some embodiments, RAN environment 1000 may correspond to one or more other types of base stations of one or more other types of RANs. As shown, RAN environment 1000 may include Central Unit ("CU") 1005, one or more Distributed Units ("DUs") 1003-1 through 1003-M (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 815 and/or UPF 905) and/or some other device or system such as MEC 814. In the uplink direction (e.g., for traffic from UEs 801 to a core network), CU 1005 may aggregate traffic from DUs 1003, and forward the aggregated traffic to the core network. In some embodiments, CU 1005 may receive traffic according to a given protocol (e.g., Radio Link Control ("RLC") traffic) from DUs 1003, and may perform higher-layer processing (e.g., may aggregate/process RLC packets and generate Packet Data Convergence Protocol ("PDCP") packets based on the RLC packets) on the traffic received from DUs 1003.

CU 1005 may receive downlink traffic (e.g., traffic from the core network, traffic from a given MEC 814, etc.) for a particular UE 801, and may determine which DU(s) 1003 should receive the downlink traffic. DU 1003 may include one or more devices that transmit traffic between a core network (e.g., via CU 1005) and UE 801 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 801.

RU 1001 may include hardware circuitry (e.g., one or more RF transceivers, antennas, radios, and/or other suitable hardware) to communicate wirelessly (e.g., via an RF interface) with one or more UEs 801, one or more other DUs 1003 (e.g., via RUs 1001 associated with DUs 1003), and/or any other suitable type of device. In the uplink direction, RU 1001 may receive traffic from UE 801 and/or another DU 1003 via the RF interface and may provide the traffic to DU 1003. In the downlink direction, RU 1001 may receive traffic from DU 1003, and may provide the traffic to UE 801 and/or another DU 1003.

One or more elements of RAN environment 1000 may, in some embodiments, be communicatively coupled to one or more MECs 814. For example, DU 1003-1 may be communicatively coupled to MEC 814-1, DU 1003-M may be communicatively coupled to MEC 814-N, CU 1005 may be communicatively coupled to MEC 814-2, and so on. MECs 814 may include hardware resources (e.g., configurable or provisionable hardware resources) that may be configured to provide services and/or otherwise process traffic to and/or from UE 801, via a respective RU 1001.

For example, DU 1003-1 may route some traffic, from UE 801, to MEC 814-1 instead of to a core network via CU 1005. MEC 814-1 may process the traffic, perform one or more computations based on the received traffic, and may provide traffic to UE 801 via RU 1001-1. As discussed above, MEC 814 may include, and/or may implement, some or all of the functionality described above with respect to UPF 905, AF 830, and/or one or more other devices, systems, VNFs, CNFs, etc. In this manner, ultra-low latency services may be provided to UE 801, as traffic does not need to traverse DU 1003, CU 1005, links between DU 1003 and CU 1005, and an intervening backhaul network between RAN environment 1000 and the core network.

Figure 11:
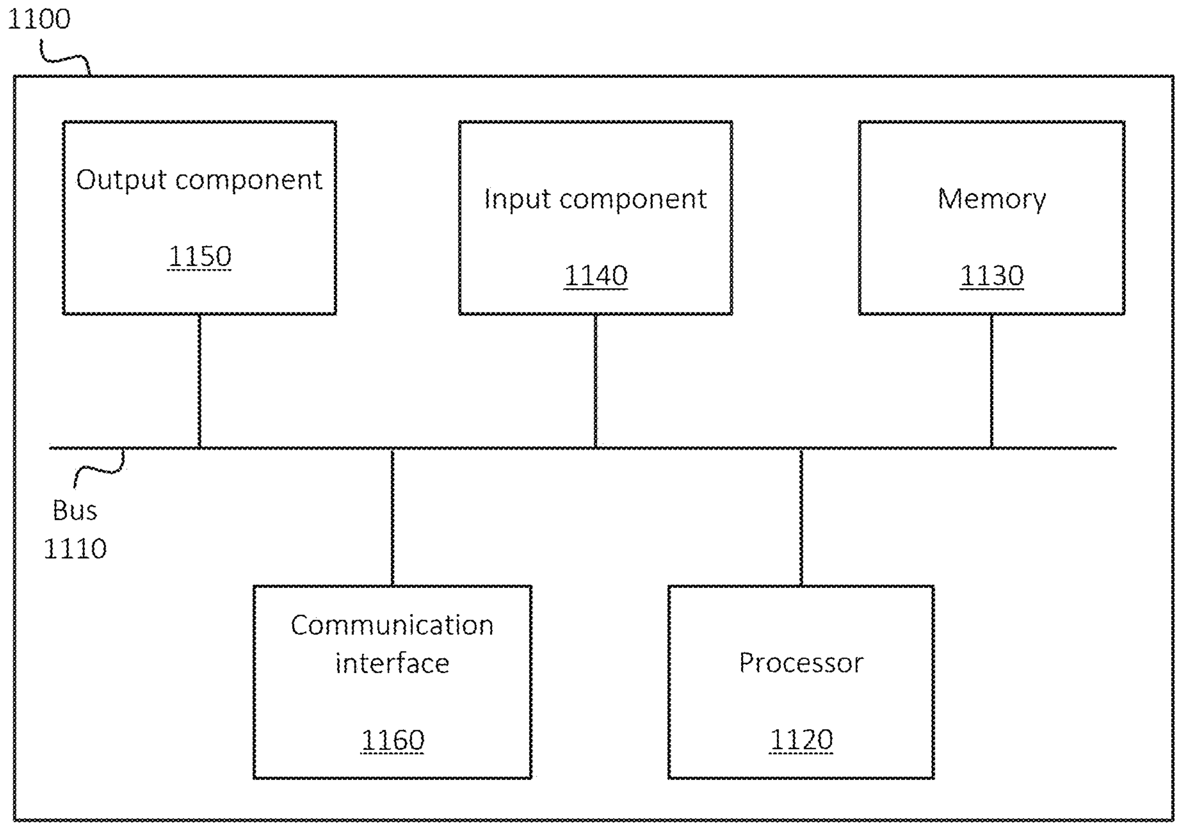
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, a set of provisioned hardware resources of a cloud computing system, or other suitable type of hardware that interprets and/or executes instructions (e.g., processor-executable instructions). In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to input component 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems (e.g., via RAN 810, RAN 812, DN 850, etc.). For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1100 may include more than one communication interface 1160. For instance, device 1100 may include an optical interface, a wireless interface, an Ethernet interface, and/or one or more other interfaces.

Device 1100 may perform certain operations relating to one or more processes described above. Device 1100 may perform these operations in response to processor 1120 executing instructions, such as software instructions, processor-executable instructions, etc. stored in a computer-readable medium, such as memory 1130. A computer-readable medium may be defined as a non-transitory memory device. A memory device may include space within a single physical memory device or spread across multiple physical memory devices. The instructions may be read into memory 1130 from another computer-readable medium or from another device. The instructions stored in memory 1130 may be processor-executable instructions that cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:

one or more interfaces; and one or more processors configured to:

receive, from a wireless network that includes a plurality of network slices, authorization to access the wireless network via at least a first network slice and a second network slice of the plurality of network slices;

maintain a set of slice forwarding rules that include information associating a first set of traffic attributes with the first network slice, and further associating a second set of traffic attributes with the second network slice;

receive, via a particular interface of the one or more interfaces, traffic from a second device;

identify attributes of the traffic received from the second device;

compare the attributes of the traffic to the first and second sets of traffic attributes included in the slice forwarding rules;

determine, based on the comparing, that the attributes of the traffic match the first set of attributes associated with the first network slice of the wireless network;

select, based on determining that the attributes of the traffic match the first set of attributes associated with the first network slice of the wireless network, the first network slice; and output, based on selecting the first network slice, the traffic to the wireless network via the first network slice.

2. The first device of claim 1, wherein the first network slice is a network slice that has been allocated for a particular group of devices that includes the first device, wherein outputting the traffic to the wireless network includes outputting the traffic to a third device, via the wireless network, that is in the particular group of devices.

3. The first device of claim 1, wherein the wireless network maintains information authorizing the first device to access the first network slice.

4. The first device of claim 3, wherein the wireless network denies access, to the first network slice, to devices that are not authorized to access the first network slice.

5. The first device of claim 1, wherein the first device is communicatively coupled to a radio access network ("RAN") of the wireless network, wherein outputting the traffic to the wireless network includes outputting the traffic via the RAN.

6. The first device of claim 5, wherein the first device communicates with the RAN via a first radio access technology ("RAT"), and wherein the one or more interfaces include a wireless interface that implements a second RAT that is different from the first RAT.

7. The first device of claim 1, wherein the one or more processors are further configured to:

output a first indication, to the second device, that the first device is authorized to access the first network slice; and receive, from the second device and after outputting the first indication, a second indication that the traffic is associated with the first network slice, wherein determining that the attributes of the traffic match the particular set of attributes associated with the first network slice of the wireless network is further based on the second indication received from the second device.

8. A non-transitory computer-readable medium, storing a plurality of processor-executable instructions to:

receive, from a wireless network that includes a plurality of network slices, authorization to access the wireless network via at least a first network slice and a second network slice of the plurality of network slices;

maintain a set of slice forwarding rules that include information associating a first set of traffic attributes with the first network slice, and further associating a second set of traffic attributes with the second network slice;

receive traffic from a particular device;

identify attributes of the traffic received from the particular device;

compare the attributes of the traffic to the first and second sets of traffic attributes included in the slice forwarding rules;

determine, based on the comparing, that the attributes of the traffic match the first set of attributes associated with the first network slice of the wireless network;

select, based on determining that the attributes of the traffic match the first set of attributes associated with the first network slice of the wireless network, the first network slice; and output, based on selecting the first network slice, the traffic to the wireless network via the first network slice.

9. The non-transitory computer-readable medium of claim 8, wherein the first network slice is a network slice that has been allocated for a particular group of devices, wherein outputting the traffic to the wireless network includes outputting the traffic to another device, via the wireless network, that is in the particular group of devices.

10. The non-transitory computer-readable medium of claim 8, wherein the wireless network denies access, to the first network slice, to devices that are not authorized to access the first network slice.

11. The non-transitory computer-readable medium of claim 8, wherein outputting the traffic to the wireless network includes outputting the traffic via a radio access network ("RAN") of the wireless network.

12. The non-transitory computer-readable medium of claim 11, wherein the RAN implements a first radio access technology ("RAT"), and wherein the traffic is received from the particular device via a second RAT that is different from the first RAT.

13. The non-transitory computer-readable medium of claim 8, wherein the plurality of processor-executable instructions further include processor-executable instructions to:

output a slice authorization indication, associated with the first network slice, to the particular device; and receive, from the particular device, an indication that the traffic is associated with the first network slice, wherein determining that the attributes of the traffic match the particular set of attributes associated with the first network slice of the wireless network is further based on the indication received from the particular device.

14. A method, comprising:

receiving, by a first device that includes one or more interfaces, and from a wireless network that includes a plurality of network slices, authorization to access the wireless network via at least a first network slice and a second network slice of the plurality of network slices;

maintaining, by the first device, a set of slice forwarding rules that include information associating a first set of traffic attributes with the first network slice, and further associating a second set of traffic attributes with the second network slice;

receiving, by the first device, authorization to access the wireless network via at least a first network slice and a second network slice of the plurality of network slices receiving, via a particular interface of the one or more interfaces, traffic from a second device;

identifying attributes of the traffic received from the second device;

comparing the attributes of the traffic to the first and second sets of traffic attributes included in the slice forwarding rules;

determining, based on the comparing, that the attributes of the traffic match the first set of attributes associated with the first network slice of the wireless network;

selecting, based on determining that the attributes of the traffic match the first set of attributes associated with the first network slice of the wireless network, the first network slice; and outputting, based on selecting the first network slice, the traffic to the wireless network via the first network slice.

15. The method of claim 14, wherein the first network slice is a network slice that has been allocated for a particular group of devices that includes the first device, wherein outputting the traffic to the wireless network includes outputting the traffic to a third device, via the wireless network, that is in the particular group of devices.

16. The method of claim 14, wherein the wireless network maintains information authorizing the first device to access the first network slice.

17. The method of claim 16, wherein the wireless network denies access, to the first network slice, to devices that are not authorized to access the first network slice.

18. The method of claim 14, wherein the first device is communicatively coupled to a radio access network ("RAN") of the wireless network, wherein outputting the traffic to the wireless network includes outputting the traffic via the RAN.

19. The method of claim 18, wherein the first device communicates with the RAN via a first radio access technology ("RAT"), and wherein the one or more interfaces include a wireless interface that implements a second RAT that is different from the first RAT.

20. The method of claim 14, further comprising:

outputting an indication, to the second device, that the first device is authorized to access the first network slice; and receiving, from the second device, an indication that the traffic is associated with the first network slice, wherein determining that the attributes of the traffic match the particular set of attributes associated with the first network slice of the wireless network is further based on the indication received from the second device.

* * * * *